United States Patent
Ono et al.

(10) Patent No.: US 10,859,455 B2
(45) Date of Patent: Dec. 8, 2020

(54) BRAKE INSPECTION DEVICE AND MOTOR CONTROLLER

(71) Applicant: Fanuc Corporation, Yamanashi (JP)

(72) Inventors: Katsuya Ono, Yamanashi (JP); Hidetoshi Uematsu, Yamanashi (JP); Takeshi Tamaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 322 days.

(21) Appl. No.: 16/009,809

(22) Filed: Jun. 15, 2018

(65) Prior Publication Data
US 2019/0017890 A1 Jan. 17, 2019

(30) Foreign Application Priority Data

Jul. 13, 2017 (JP) .................................. 2017-137152

(51) Int. Cl.
*G01L 5/28* (2006.01)
*G01L 3/00* (2006.01)

(52) U.S. Cl.
CPC . *G01L 5/28* (2013.01); *G01L 3/00* (2013.01)

(58) Field of Classification Search
CPC ......... G01L 5/28; G01L 3/00; G05B 23/0213; G05B 2219/24065
See application file for complete search history.

(56) References Cited

U.S. PATENT DOCUMENTS

| | | | |
|---|---|---|---|
| 9,260,094 B2* | 2/2016 | Yuasa | B60T 17/221 |
| 9,694,688 B2* | 7/2017 | Oyama | B60L 3/0046 |
| 9,744,862 B2* | 8/2017 | Arbitmann | B60T 8/1761 |
| 10,352,383 B2* | 7/2019 | Masuda | F16D 65/183 |
| 2010/0058850 A1 | 3/2010 | Ortmaier et al. | |
| 2015/0123577 A1* | 5/2015 | Omata | B60L 15/20 318/400.02 |
| 2015/0160595 A1 | 6/2015 | Tamada et al. | |
| 2016/0156288 A1* | 6/2016 | Sawamura | G05B 19/406 318/372 |

(Continued)

FOREIGN PATENT DOCUMENTS

| | | |
|---|---|---|
| EP | 3025828 A1 | 6/2016 |
| JP | H06-284766 A | 10/1994 |

(Continued)

OTHER PUBLICATIONS

Japan Patent Office, Office Action dated Mar. 20, 2018 for Japan Patent Application No. 2016-082220.

(Continued)

*Primary Examiner* — Mohammad K Islam
(74) *Attorney, Agent, or Firm* — Shackelford, Bowen, McKinley & Norton, LLP (57) ABSTRACT

Provided is a brake inspection device including: load torque measurement units configured to respectively measure: load torques as a motor is normally rotated and reversely rotated in a released state where an operation of a brake for holding a rotor with respect to a stator of the motor is released; and a load torque as the motor is rotationally driven in either one of a normal direction or a reverse direction in a locked state where the brake is operated; and a determination unit configured to determine a state of the brake based on the load torques measured by the load torque measurement units.

9 Claims, 7 Drawing Sheets (56) References Cited

U.S. PATENT DOCUMENTS

| | | |
|---|---|---|
| 2016/0346885 A1 | 12/2016 | Ikai et al. |
| 2017/0033714 A1 | 2/2017 | Ono et al. |
| 2017/0108071 A1 | 4/2017 | Saito et al. |
| 2017/0299452 A1 | 10/2017 | Yasuda et al. |

FOREIGN PATENT DOCUMENTS

| | | |
|---|---|---|
| JP | 3081258 B2 | 8/2000 |
| JP | 2000-324885 A | 11/2000 |
| JP | 2005-254410 A | 9/2005 |
| JP | 2014-227233 A | 12/2014 |
| JP | 2015-108764 A | 6/2015 |
| JP | 2016-101643 A | 6/2016 |
| JP | 2017-34856 A | 2/2017 |
| JP | 2017-74837 A | 4/2017 |
| JP | 2017-192267 A | 10/2017 |
| KR | 20130099237 A | 9/2013 |

OTHER PUBLICATIONS

Japan Patent Office, Office Action dated Apr. 23, 2019 for Japan Patent Application No. 2017-137152.
Japan Patent Office, Search Report dated Apr. 18, 2019 for Japan Patent Application No. 2017-137152.

* cited by examiner

BRAKE INSPECTION DEVICE AND MOTOR CONTROLLER

CROSS-REFERENCE TO RELATED APPLICATIONS

This application claims the benefit of Japanese Patent Application No. 2017-137152, the content of which is incorporated herein by reference.

TECHNICAL FIELD

The present invention relates to a brake inspection device and a motor controller.

BACKGROUND ART

Conventionally, there is known a method for detecting the failure of a brake where a load torque at which the brake is in a released state is measured, and the measured load torque is compared with a normal load torque which is set in advance so as to detect presence or absence of an abnormality of the brake (see PTL 1 and PTL 2, for example).

CITATION LIST

Patent Literature

{PTL 1} Japanese Unexamined Patent Application, Publication No. Hei6-284766
{PTL 2} Japanese Unexamined Patent Application, Publication No. 2000-324885

SUMMARY OF INVENTION

One aspect of the present invention provides a brake inspection device including: a load torque measurement unit configured to respectively measure: load torques as a motor is normally rotated and reversely rotated in a released state where an operation of a brake for holding a rotor with respect to a stator of the motor is released; and a load torque as the motor is rotationally driven in either one of a normal direction or a reverse direction in a locked state where the brake is operated; and a determination unit configured to determine a state of the brake based on the load torques measured by the load torque measurement unit.

DESCRIPTION OF EMBODIMENTS

A brake inspection device 11 and a motor controller 1 according to one embodiment of the present invention are described hereinafter with reference to drawings.

Figure 1:
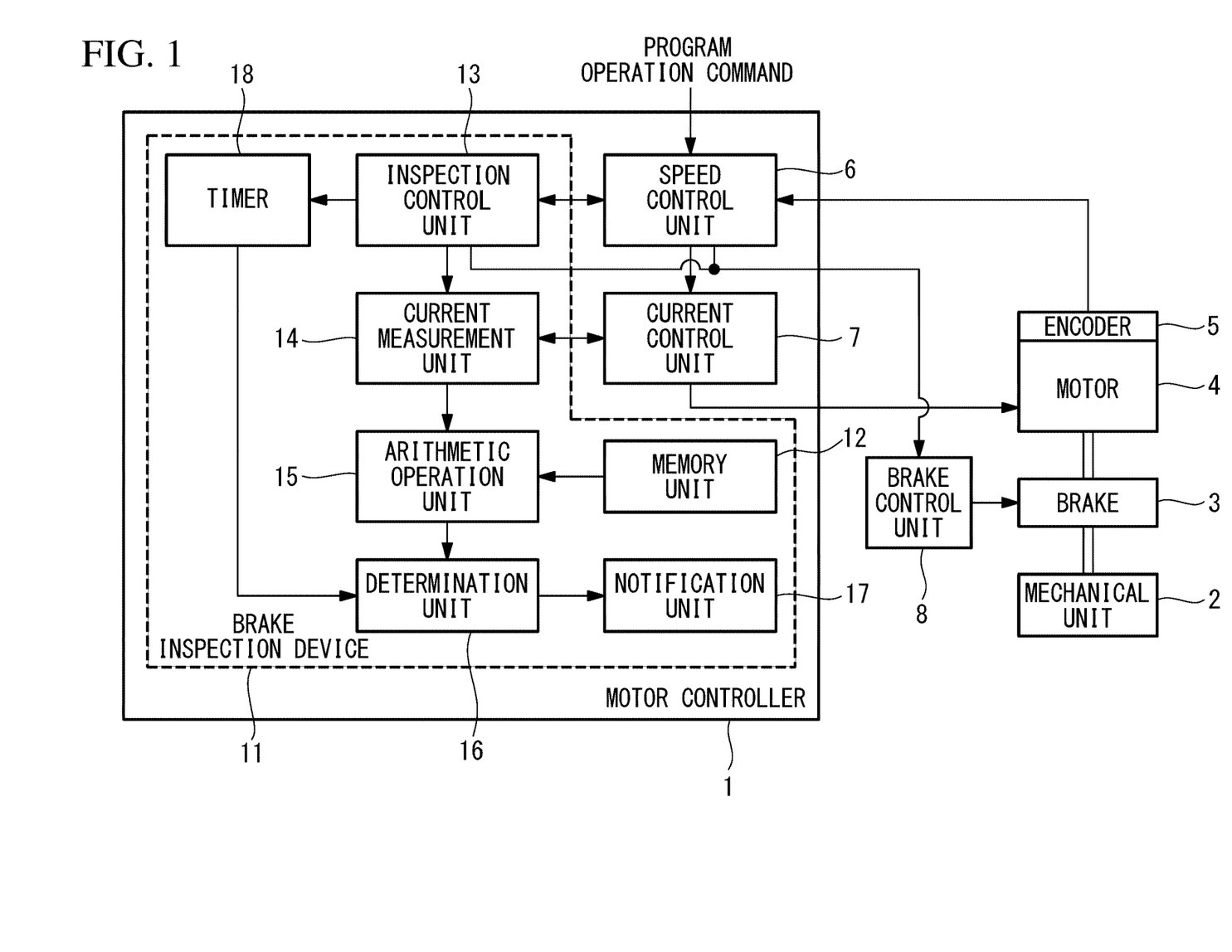
FIG. 1 is a block diagram showing a motor controller according to one embodiment of the present invention.

As shown in FIG. 1, the motor controller 1 according to this embodiment is an apparatus which is connected to a motor 4 equipped with a brake 3 mounted on a mechanical unit 2 such as a machine tool, and is configured to control the motor 4 in accordance with a program operation command from the outside of the motor controller 1.

The motor controller 1 includes: a speed control unit 6; a current control unit 7; and the brake inspection device 11 according to this embodiment. The speed control unit 6 is configured to control a rotational speed of the motor 4 based on a rotational speed command (or a rotation angle command) for the motor 4 according to a program operation command inputted from the outside of the motor controller 1, and based on a rotational speed of the motor 4 which is fed back from an encoder 5. The current control unit 7 is configured to control an electric current to be supplied to the motor 4 based on a drive command outputted from the speed control unit 6.

A brake control unit 8 is connected to the brake 3. The brake control unit 8 is configured to change over, in response to a command signal from the speed control unit 6 based on the program operation command, between a locked state where a rotor is braked with respect to a stator of the motor 4 and a released state where the locked state is released.

The brake inspection device 11 includes: a memory unit 12; an inspection control unit 13; a current measurement unit (load torque measurement unit) 14; an arithmetic operation unit (load torque measurement unit) 15; a determination unit 16; and a notification unit 17. The memory unit 12 is configured to store various constants and the like. The inspection control unit 13 is configured to execute an inspection program during control of the motor 4 based on a program operation command. The current measurement unit 14 is configured to measure an electric current to be supplied to the motor 4 by the current control unit 7. The arithmetic operation unit 15 is configured to calculate a load torque using an electric current value measured by the current measurement unit 14. The determination unit 16 is configured to determine a state of the brake 3 based on the load torque calculated by the arithmetic operation unit 15. The notification unit 17 is configured to notify an abnormality when any abnormality is present as a result of the determination made by the determination unit 16.

The current control unit 7 is configured to control an electric current to be supplied to the motor 4 with the feedback of an electric current value measured by the current measurement unit 14.

The inspection control unit 13 is, with the reception of a rotational speed command from the speed control unit 6, configured to control the current control unit 7 so as to output an electric current value measured by the current measurement unit 14 to the arithmetic operation unit 15 at a predetermined timing, and configured to control the speed control unit 6 so as to output a specific rotational speed command at a predetermined timing. The inspection control unit 13 is also configured to control the brake control unit 8 at a predetermined timing.

The arithmetic operation unit 15 is configured to calculate load torques using the following formulae (1) to (3).

$$Tu = Kt \times A1 \quad (1)$$

$$Td = Kt \times A2 \quad (2)$$

$$Tu' = Kt \times A3 \quad (3)$$

In the formulae, Tu denotes a load torque at which the motor 4 is normally rotated in a released state, Td denotes a load torque at which the motor 4 is reversely rotated in a released state, Tu' denotes a load torque at which the motor 4 is driven in a locked state, Kt denotes a torque constant of the motor 4 stored in the memory unit 12, A1 denotes an electric current value at which the motor 4 is normally rotated at a constant speed in a released state, A2 denotes an electric current value at which the motor 4 is reversely rotated at a constant speed in a released state, and A3 denotes an electric current value at which the motor 4 is rotationally driven in a locked state.

Figure 2:
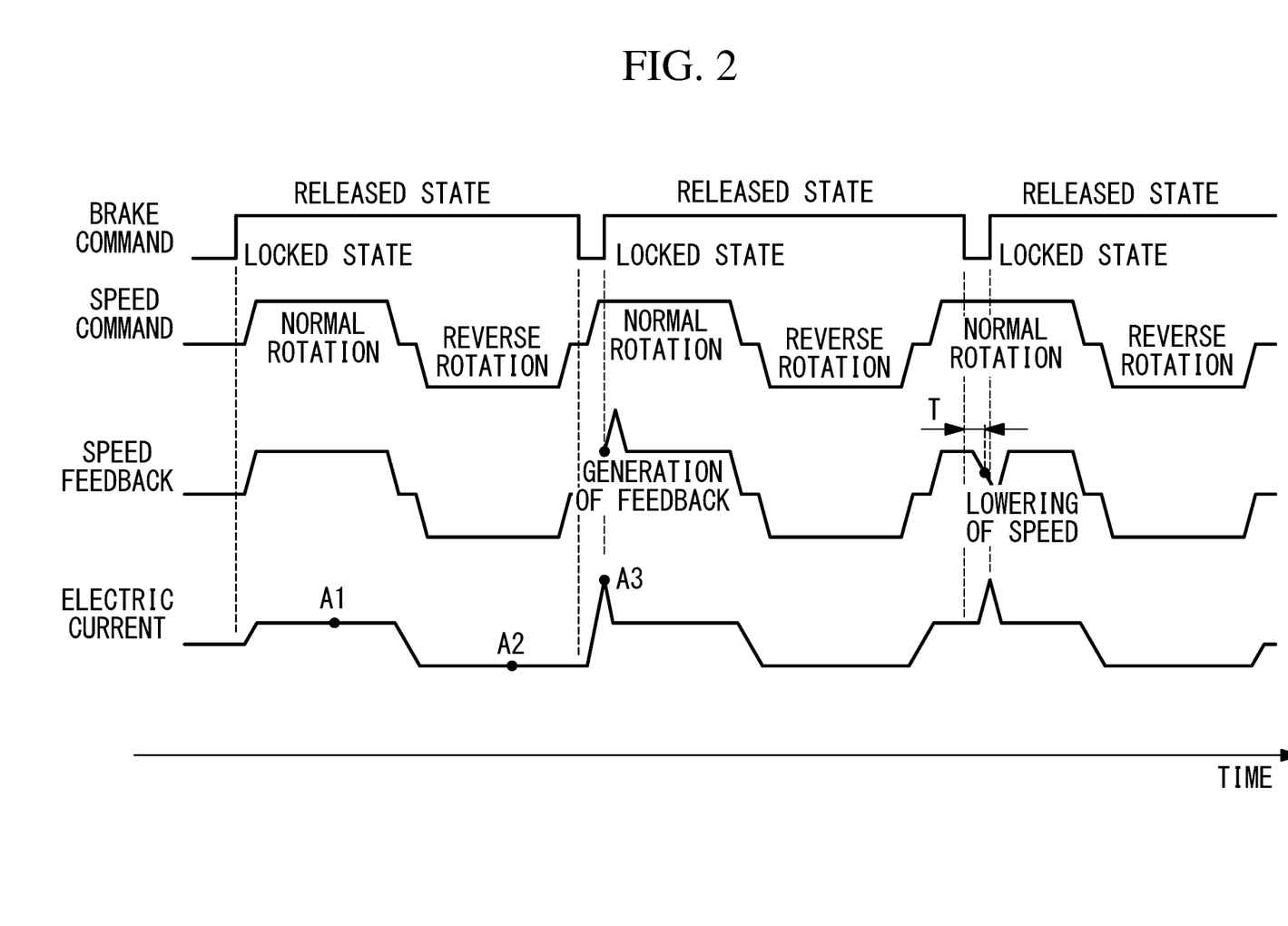
FIG. 2 is a time chart showing the relationship between a brake command, a speed command, speed feedback and an electric current in the motor controller in FIG. 1.

To be more specific, as shown in FIG. 2, during the operation of the mechanical unit 2 according to a program operation command, the current measurement unit 14 measures electric current values A1, A2, A3.

It is preferable to measure the electric current values A1, A2 in a state where the motor 4 is disposed at the same rotation angle position. That is, by measuring electric current values in the state where the mechanical unit 2 is disposed at the same position, the electric current values can be correctly measured even when a gravity load torque changes corresponding to the position of the mechanical unit 2.

The inspection control unit 13 issues, to the speed control unit 6, a command to normally rotate (or reversely rotate) the motor 4 with the brake 3 in a locked state and, at the point of time when a speed equal to or more than a predetermined threshold is generated due to the speed feedback from the encoder 5, the electric current value A3 is measured by the current measurement unit 14. A speed which reaches 100% of a speed command may be selected as a speed equal to or more than a predetermined threshold, for example. Further, an average value between an electric current value as the motor 4 is normally rotated and an electric current value as the motor 4 is reversely rotated may be adopted as the electric current value A3.

The brake inspection device 11 also includes a timer 18. The timer 18 is configured to measure a time T from the point of time when, as shown in FIG. 2, in a state where the motor 4 is normally rotated with the brake 3 in a released state, the inspection control unit 13 controls the brake control unit 8 so as to change over a state of the brake 3 to a locked state to the point of time when a speed is lowered to a predetermined speed due to a speed feedback. As the predetermined speed, for example, a speed which is lowered to approximately 50% of a speed command may be selected.

When a speed slightly lowered from a speed command or a speed which is approximately zero is selected, such a selection easily becomes a cause of an erroneous determination. Accordingly, by selecting a speed which is lowered to approximately 50% of a speed command, a speed can be accurately detected, and an erroneous determination can be prevented. Further, the rapid lowering in speed occurs immediately after the operation of the brake 3 and hence, even when the timer 18 waits until the speed is lowered to approximately 50%, the timer 18 can measure a time with minimal error.

The arithmetic operation unit 15 is configured to calculate load torques $Tg$, $T\mu$, $Tb$ using the following formulae.

$$Tg = (Tu + Td)/2 \qquad (4)$$

$$T\mu = (Tu - Td)/2 \qquad (5)$$

$$Tb = Tu' - Tg \qquad (6)$$

The determination unit 16 is configured to determine states of the brake 3 and the motor 4 using the following formulae.

$$Tg/Tb \geq Th1 \qquad (7)$$

$$T\mu/Tb \geq Th2 \qquad (8)$$

$$T\mu \geq Th3 \qquad (9)$$

In the formulae, Th1, Th2, Th3 respectively denote predetermined thresholds.

Tg denotes a gravity load torque, $T\mu$ denotes a mechanical friction torque, and Tu' denotes a load torque in a locked state. Accordingly, Tb denotes a brake holding torque obtained by removing a gravity load torque Tg from a load torque Tu' in a locked state.

The formula (7) shows the ratio of the magnitudes of a gravity load torque Tg to a brake holding torque Tb. When the formula (7) is satisfied, the determination unit 16 determines that an insufficient brake holding torque abnormality is present.

The formula (8) shows the ratio of the magnitudes of a mechanical friction torque $T\mu$ to a brake holding torque Tb. When the formula (8) is satisfied, the determination unit 16 determines that a brake release abnormality is present.

The formula (9) shows a magnitude of a mechanical friction torque $T\mu$ per se. When the formula (9) is satisfied, the determination unit 16 determines that a motor abnormality is present.

When a time T measured by the timer 18 is equal to or more than a predetermined threshold Th4, the determination unit 16 determines that an operation delay abnormality of the brake 3 is present.

When it is determined by the determination unit 16 that an insufficient brake holding torque abnormality, a brake release abnormality or a motor abnormality is present, or when it is determined by the determination unit 16 that an operation delay abnormality of the brake 3 is present, the notification unit 17 notifies such an abnormality.

As a method for notifying an abnormality, any desired method may be adopted such as notification by displaying a letter or an image on a monitor, or by voice or vibration.

An operation of the brake inspection device 11 and the motor controller 1 according to this embodiment having the above-mentioned configuration is described hereinafter.

Figure 3:
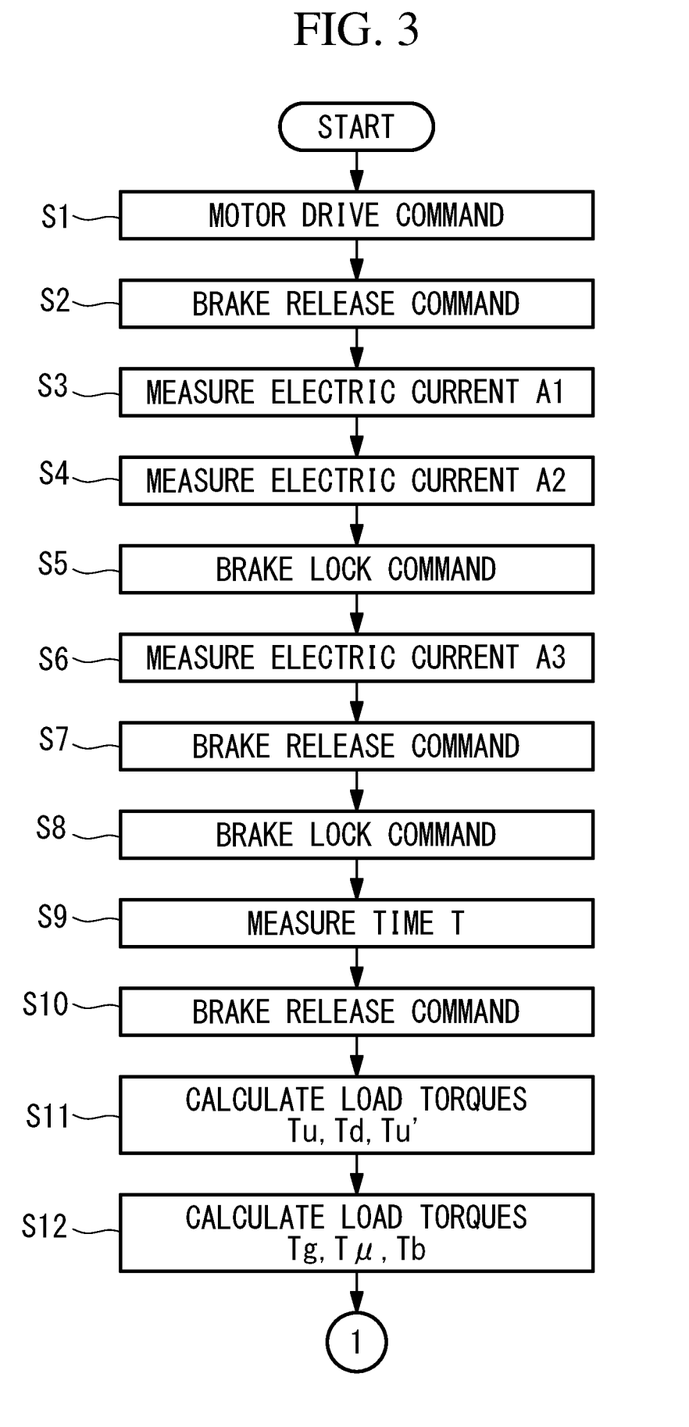
FIG. 3 is a flowchart for describing the operation of a brake inspection device according to one embodiment of the present invention which is provided to the motor controller in FIG. 1.

As shown in FIG. 3, when the motor controller 1 receives an operation command for the motor 4 with the operation of an operation program, the speed control unit 6 of the motor controller 1 outputs a drive command for the motor 4 (step S1), and outputs an operation command for the brake control unit 8. When the motor 4 rotates, a rotational speed of the motor 4 is detected by the encoder 5. The rotational speed of the motor 4 is fed back to the speed control unit 6 so that the speed control unit 6 controls a speed of the motor 4 based on the fed back rotational speed and the operation command.

The current control unit 7 calculates an electric current to be supplied to the motor 4 based on the drive command outputted from the speed control unit 6. Further, a value of an electric current, which is actually supplied to the motor 4 and is measured by the current measurement unit 14, is fed back to the current control unit 7. Accordingly, the current control unit 7 controls an electric current to be supplied to the motor 4 based on the fed back value of the electric current and the drive command.

Then, the brake control unit 8 outputs a release command for the brake 3 (step S2). In a state where the brake 3 is in a released state, with a speed command issued, electric current values A1, A2 as the motor 4 is normally rotated and reversely rotated are outputted to the arithmetic operation unit 15, wherein the electric current values A1, A2 are measured by the current measurement unit 14 with the mechanical unit 2 disposed at substantially the same position (steps S3, S4).

After the electric current values A1, A2 are outputted to the arithmetic operation unit 15, in a state where the motor 4 is normally rotated with the brake 3 being in a released state, the inspection control unit 13 outputs, to the brake control unit 8, a command to bring the brake 3 into a locked state (step S5). An electric current value A3, measured at the point of time when a rotational speed fed back from the encoder 5 exceeds a predetermined threshold, is outputted to the arithmetic operation unit 15 from the current measurement unit 14 (step S6).

Then, the inspection control unit 13 outputs a command to change over a state of the brake 3 to a released state again (step S7). In a state where the motor 4 is normally rotated with the brake 3 in a released state, the inspection control unit 13 outputs, to the brake control unit 8, a command to bring the brake 3 into a locked state (step S8). A time T from the point of time when the command to bring the brake 3 into a locked state is outputted to the point of time when the lowering of a speed is detected is measured (step S9).

Next, after the time T is measured, the inspection control unit 13 outputs a command to change over a state of the brake 3 to a released state (step S10). Load torques Tu, Td are calculates based on the measured electric current values A1, A2, and a load torque Tu' is calculated based on the measured electric current value A3 (step S11).

Figure 4:
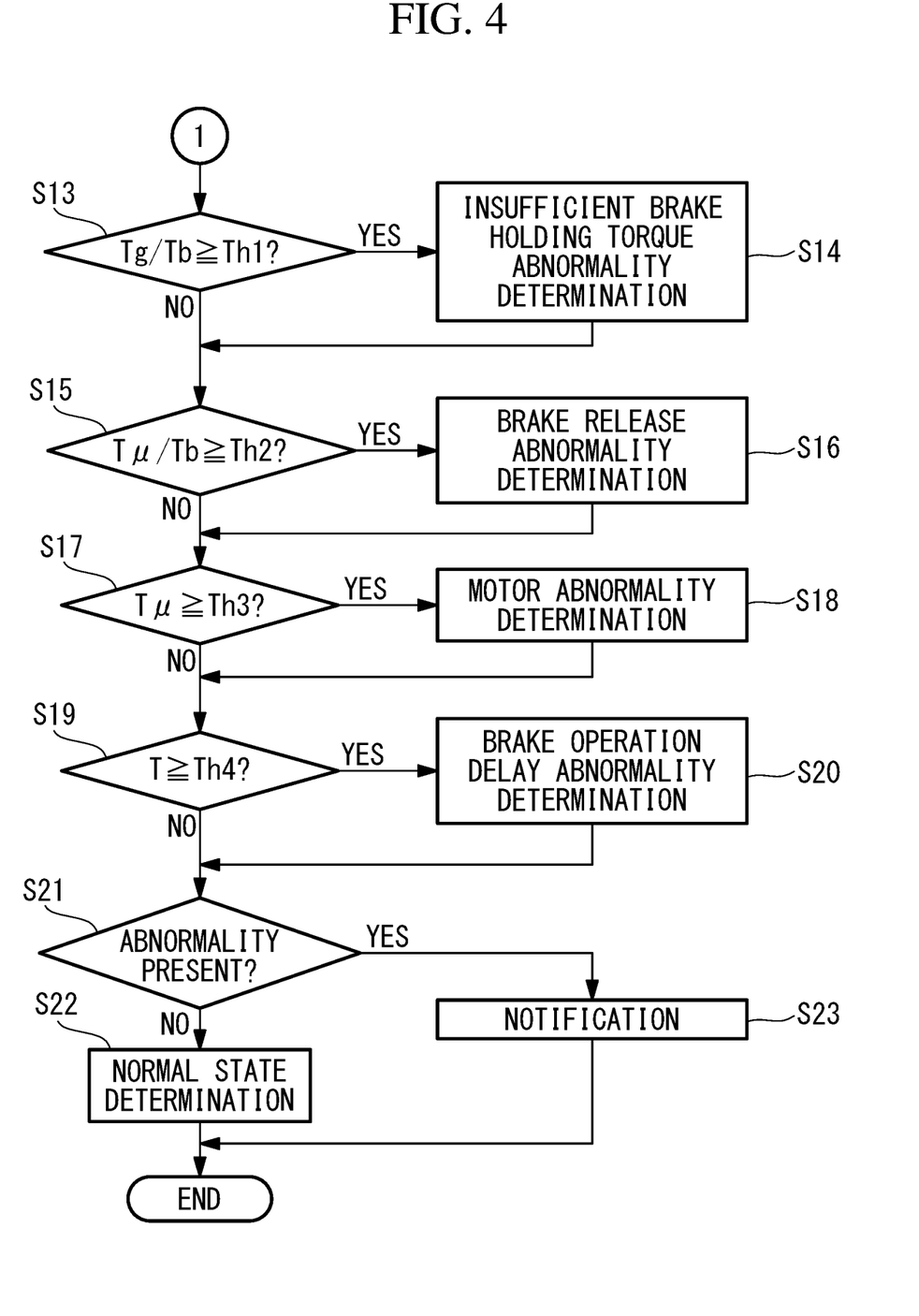
FIG. 4 is a flowchart which is a continuation of FIG. 3.

After the load torques Tu, Td, Tu' are calculated, load torques Tg, Tµ, Tb are calculated using the measured electric current values A1, A2, A3 (step S12). Hereinafter, as shown in FIG. 4, a state of the brake 3 and a state of the motor 4 are determined.

That is, it is determined whether or not the formula (7) is satisfied in step S13. When the formula (7) is satisfied, it is determined that an insufficient brake holding torque abnormality is present (step S14).

It is determined whether or not the formula (8) is satisfied in step S15. When the formula (8) is satisfied, it is determined that a brake release abnormality is present (step S16).

Further, it is determined whether or not the formula (9) is satisfied in step S17. When the formula (9) is satisfied, it is determined that a motor abnormality is present (step S18).

Still further, it is determined whether or not a time T is equal to or more than a predetermined threshold Th4 in step S19. When a time T is equal to or more than the threshold Th4, it is determined that a brake operation delay abnormality is present (step S20).

In step S21, it is determined whether or not an abnormality is determined between step S13 and step S20. When no condition is satisfied, it is determined that the brake 3 and the motor 4 are in a normal state (step S22). On the other hand, when any condition is satisfied, it is notified by the notification unit 17 that such an abnormality is present (step S23).

As described above, according to the brake inspection device 11 and the motor controller 1 of this embodiment, it is possible to acquire an advantageous effect that a state of the brake 3 can be accurately detected even when a load torque of the motor 4 changes.

Particularly, a brake holding torque Tb is calculated by the formula (6) where a gravity load torque Tg is removed from a load torque Tu' in a locked state. A gravity load torque Tg with respect to the brake holding torque Tb is determined by the formula (7). A mechanical friction torque Tµ with respect to the brake holding torque Tb is determined by the formula (8). Accordingly, there is an advantageous effect that a state of the brake 3 can be accurately determined without being affected by the variation in magnitude of a gravity load torque Tg.

There is also an advantageous effect that it is possible to determine whether or not a brake holding torque Tb, necessary for preventing a gravity shaft from falling, can be generated based on the ratio of the magnitudes of a gravity load torque Tg to a brake holding torque Tb.

Further, with the determination of a magnitude of a mechanical friction torque Tµ per se, when a mechanical friction torque Tµ increases due to a defect in the motor 4 or a bearing or the like of the mechanical unit 2, it is possible to determine that a motor abnormality is present.

When a time T from the point of time when a lock command signal is inputted in a released state of the brake 3 to the point of time when a locked state is established is larger than a threshold Th4, the brake 3 is operated after excitation of the motor 4 is cut off. Accordingly, there is a defect that a gravity shaft (a shaft rotating in a direction of gravity) falls due to gravity within a period from the point of time when excitation is cut off to the point of time when a locked state is established. When a locked state cannot be established within a sufficiently short time, it is possible to determine based on the time T that an operation delay abnormality of the brake 3 is present.

Figure 5:
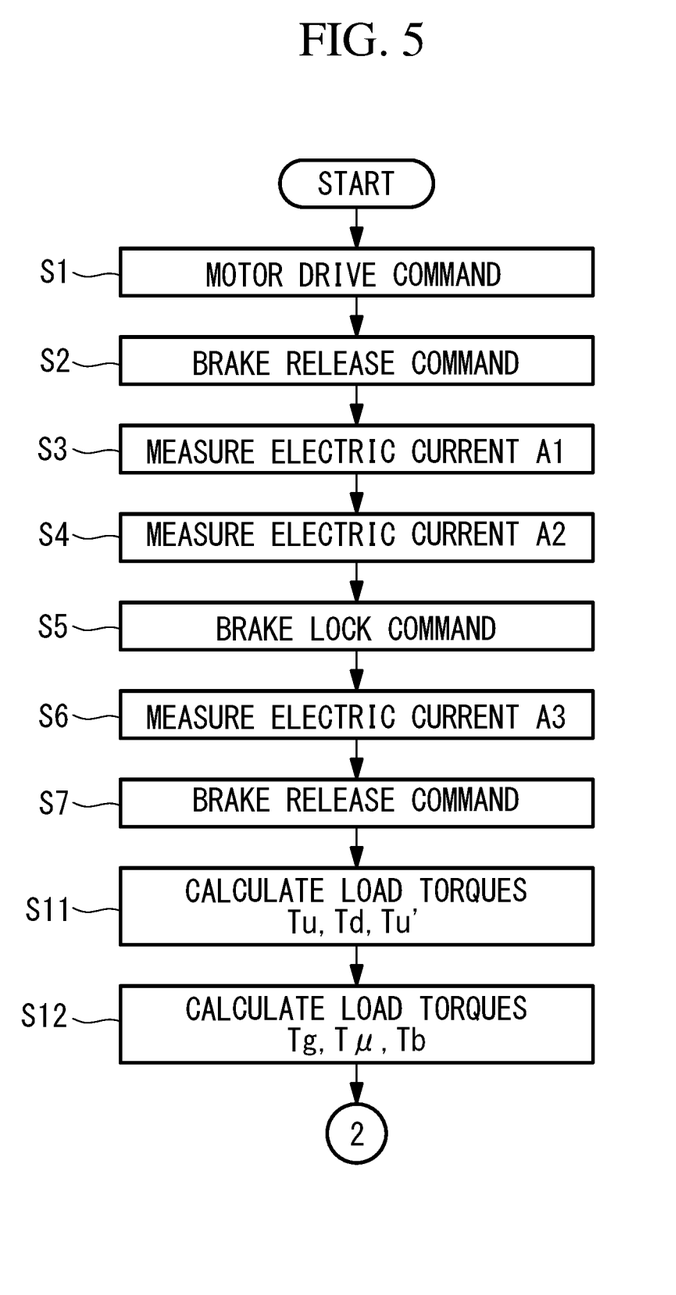
FIG. 5 is a flowchart showing a modification of FIG. 3 and FIG. 4.
Figure 6:
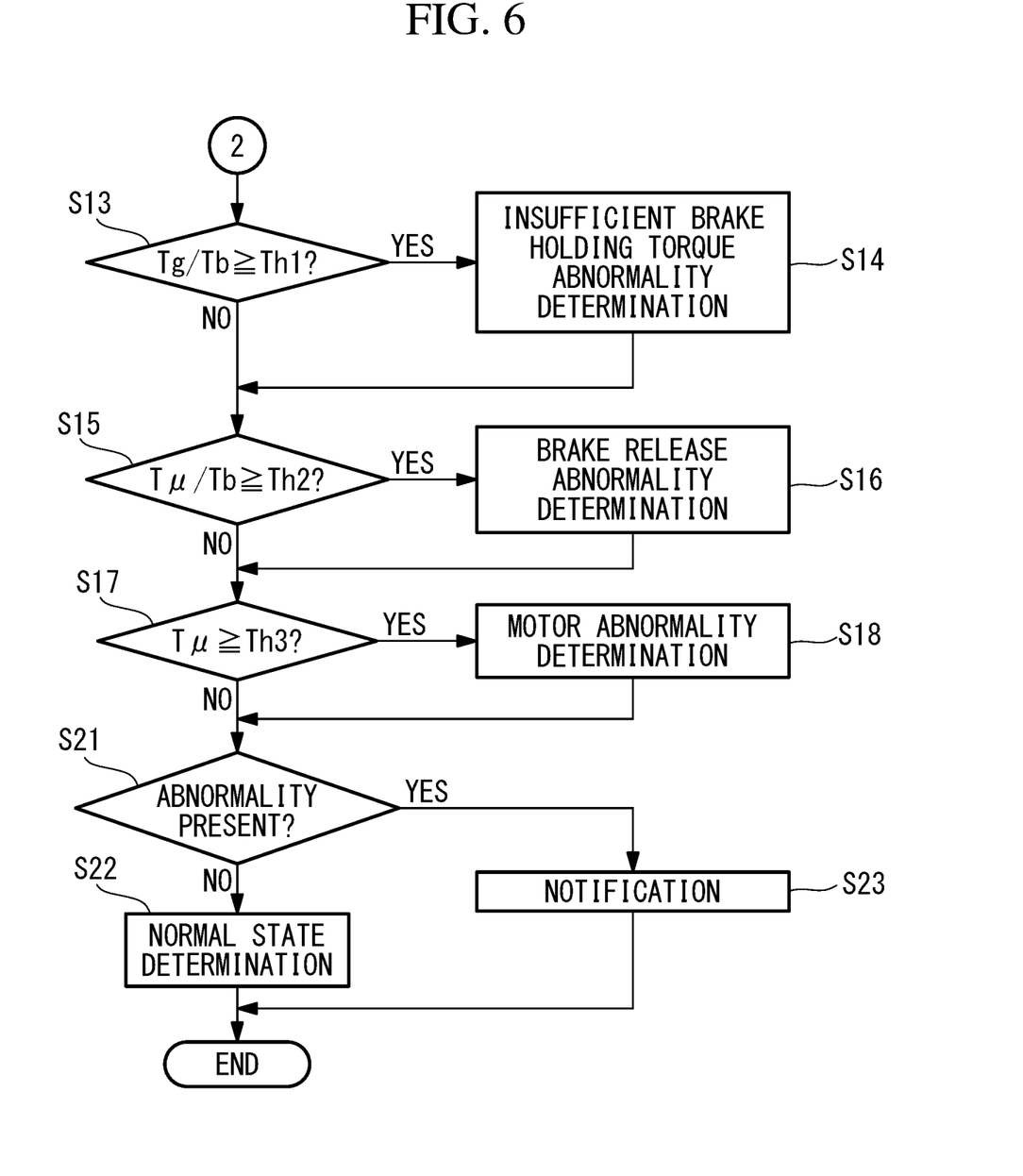
FIG. 6 is a flowchart which is a continuation of FIG. 5.

In this embodiment, the description is made with respect to a case where all of the determinations of the formulae (7) to (9) and the determination of a time T are performed. However, the present invention is not limited to such a case. That is, any one of the determinations of the formulae (7) to (9) and the determination of a time T may be performed. Alternatively, any two or more of the determinations of the formulae (7) to (9) and the determination of a time T may be performed in combination. For example, when only the determinations of the formulae (7) to (9) are performed, it is sufficient to perform the operation according to the flowcharts shown in FIG. 5 and FIG. 6.

Figure 7:
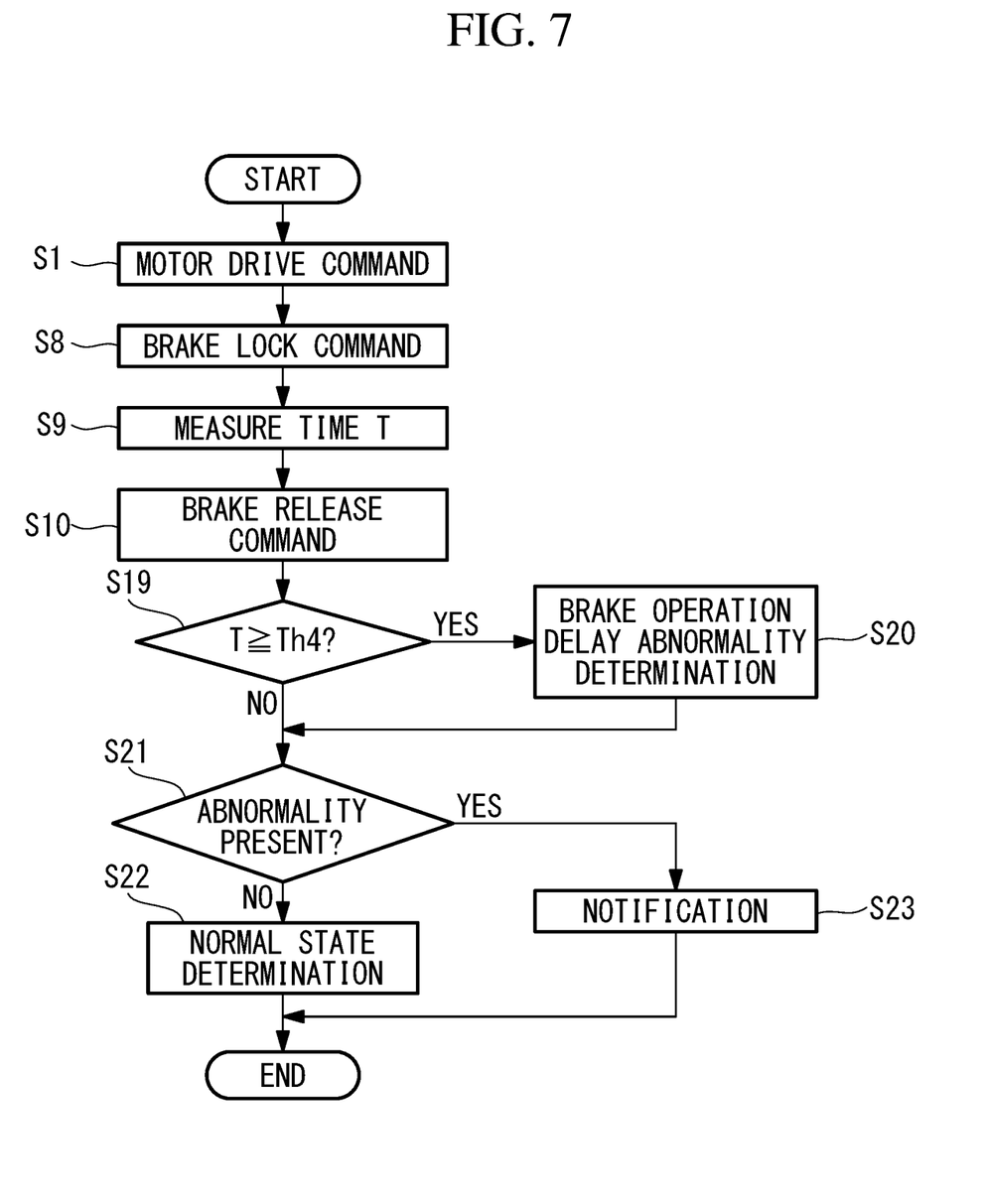
FIG. 7 is a flowchart showing another modification of FIG. 3 and FIG. 4.

When an operation delay abnormality of the brake 3 is determined based on a time T measured by the timer 18, it is unnecessary to measure an electric current value. Accordingly, an operation delay abnormality of the brake 3 may be individually determined according to the flowchart shown in FIG. 7.

In this embodiment, a rotational speed of the motor 4 is exemplified as a rotation state of the motor 4. However, instead of adopting the rotation speed of the motor 4, a rotation angle position of the motor 4 may be adopted.

In this embodiment, a case is exemplified where the determination unit 16 determines that an insufficient brake holding torque abnormality is present when the formula (7) is satisfied. However, instead of accepting such a determination, the determination unit 16 may determine that an insufficient brake holding torque abnormality is present when the following formula (10) is satisfied.

$$A\mu/Ab \geq Th1 \tag{10}$$

In the formula, Ag is equal to (A1+A2)/2, and Ab is equal to A3−Ag.

In this embodiment, a case is exemplified where the determination unit 16 determines that a brake release abnormality is present when the formula (8) is satisfied. However, instead of accepting such a determination, the determination unit 16 may determine that a brake release abnormality is present when the following formula (11) is satisfied.

$$A\mu/Ab \geq Th2 \tag{11}$$

In the formula, Aμ is equal to (A1−A2)/2, and Ab is equal to A3−Ag.

From the above-described embodiment, the following invention is derived.

One aspect of the present invention provides a brake inspection device including: a load torque measurement unit configured to respectively measure: load torques as a motor is normally rotated and reversely rotated in a released state where an operation of a brake for holding a rotor with respect to a stator of the motor is released; and a load torque as the motor is rotationally driven in either one of a normal direction or a reverse direction in a locked state where the brake is operated; and a determination unit configured to determine a state of the brake based on the load torques measured by the load torque measurement unit.

According to this aspect, in a state where the brake is operated, that is, the rotor is brought into a locked state with respect to the stator, a load torque of the motor is measured by the load torque measurement unit. Further, in a released state where the operation of the brake is released, a load torque of the motor is measured by the load torque measurement unit. A state of the brake is determined by the determination unit based on two load torques. That is, when the brake is in a defective state, for example, when the mechanical unit which releases the operation of the brake is out of order, a load torque measured in a released state increases and approaches a load torque during the operation of the brake.

Accordingly, a state of the brake can be easily determined based on a load torque measured during the operation of the brake and a load torque measured during the release of the operation of the brake. In this case, even when a load torque of the motor varies with time or changes due to individual differences of the machine or the motor, a state of the brake can be accurately detected by measuring both of a load torque during the operation of the brake and a load torque during the release of the operation of the brake and by comparing both load torques with each other.

In the above-mentioned aspect, the load torque measurement unit may measure electric current values to be supplied to the motor in the released state and the locked state, and the load torques may be calculated using following formulae.

$$Tu = Kt \times A1$$

$$Td = Kt \times A2$$

$$Tu' = Kt \times A3$$

In the formulae, Tu denotes a load torque at which the motor is normally rotated in the released state, Td denotes a load torque at which the motor is reversely rotated in the released state, Tu' denotes a load torque at which the motor is driven in the locked state, Kt denotes a torque constant of the motor, A1 denotes an electric current value at which the motor is normally rotated at a constant speed in the released state, A2 denotes an electric current value at which the motor is reversely rotated at a constant speed in the released state, and A3 denotes an electric current value at which the motor is rotationally driven in the locked state.

With such a configuration, a load torque can be calculated in a simple manner based on electric current values measured by the load torque measurement unit by normally rotating and reversely rotating the motor in the released state.

In the above-mentioned aspect, the load torque measurement unit may measure the load torque at which the motor is normally rotated in the released state and the load torque at which the motor is reversely rotated in the released state with the motor disposed at a same position.

With such a configuration, it is possible to suppress a change in electric current value which is caused by a difference in position of the motor between normal rotation and reverse rotation and hence, a load torque can be accurately measured.

In the above-mentioned aspect, the load torque measurement unit may measure an electric current value at which the motor is rotationally driven in the locked state upon an increase in position or speed of the motor.

With such a configuration, based on an electric current value measured by the load torque measurement unit in a state where the rotation of the motor is confirmed in the locked state, it is possible to determine in a simple manner that a brake holding torque is insufficient.

In the above-mentioned aspect, the determination unit may determine that an insufficient brake holding torque abnormality is present when a following formula is satisfied.

$$Tg/Tb \geq Th1$$

In the formula, Tg is equal to (Tu+Td)/2, Tb is equal to Tu'−Tg, and Th1 denotes a predetermined threshold.

With such a configuration, it is possible to determine in a simple manner that a brake holding torque is insufficient when a gravity load torque, which is obtained by calculating an average between a load torque as the motor is normally rotated and a load torque as the motor is reversely rotated, is equal to or more than a predetermined value, or when a difference between a load torque at which the brake is in the locked state and the gravity load torque is equal to or smaller than a predetermined value.

In the above-mentioned aspect, the determination unit may determine that an insufficient brake holding torque abnormality is present when a following formula is satisfied.

$$Ag/Ab \geq Th1$$

In the formula, Ag is equal to (A1+A2)/2, Ab is equal to A3−Ag, and Th1 denotes a predetermined threshold.

In the above-mentioned aspect, the determination unit may determine that a brake release abnormality is present when a following formula is satisfied.

$$T\mu/Tb \geq Th2$$

In the formula, Tμ is equal to (Tu−Td)/2, Tb is equal to Tu'−Tg, and Th2 denotes a predetermined threshold.

With such a configuration, it is possible to determine in a simple manner that a brake release abnormality is present when a mechanical friction torque, which is obtained by calculating a half of a difference between a load torque as the motor is normally rotated and a load torque as the motor is reversely rotated, is equal to or larger than a predetermined value, or when a difference between a load torque at which the brake is in the locked state and the gravity load torque is equal to or smaller than a predetermined value.

In the above-mentioned aspect, the determination unit may determine that a brake release abnormality is present when a following formula is satisfied.

$$A\mu/Ab \geq Th2$$

In the formula, Aμ is equal to (A1−A2)/2, Ab is equal to A3−Ag, and Th2 denotes a predetermined threshold.

Another aspect of the present invention provides a motor controller including any of the above-mentioned brake inspection devices, wherein the determination unit determines that a motor abnormality is present when a following formula is satisfied.

$$T\mu \geq Th3$$

In the formula, Tµ is equal to (Tu−Td)/2, and Th3 denotes a predetermined threshold.

According to this aspect, it is possible to determine that a motor abnormality is present when a mechanical friction torque is equal to or more than a predetermined value.

REFERENCE SIGNS LIST 1 motor controller
3 brake
4 motor
11 brake inspection device
14 current measurement unit (load torque measurement unit)
15 arithmetic operation unit (load torque measurement unit)
16 determination unit

The invention claimed is:

1. A brake inspection device comprising a memory, wherein the brake inspection device is configured to:
   measure a first load torque while a motor is normally rotated in a released state where an operation of a brake for holding a rotor with respect to a stator of the motor is released;
   measure a second load torque while the motor is reversely rotated in the released state;
   measure a third load torque while the motor is normally rotated in a locked state where the brake is operated; and
   determine a state of the brake based on the first, second, and third load torques and predetermined thresholds.

2. The brake inspection device according to claim 1, wherein
   the brake inspection device is configured to measure electric current values to be supplied to the motor in the released state and the locked state; and
   the first, second and third load torques are calculated using following formulae:

$$Tu=Kt \times A1$$

$$Td=Kt \times A2$$

$$Tu'=Kt \times A3$$

wherein
Tu denotes a load torque at which the motor is normally rotated in the released state,
Td denotes a load torque at which the motor is reversely rotated in the released state,
Tu' denotes a load torque at which the motor is driven in the locked state,
Kt denotes a torque constant of the motor,
A1 denotes an electric current value at which the motor is normally rotated at a constant speed in the released state,
A2 denotes an electric current value at which the motor is reversely rotated at a constant speed in the released state, and
A3 denotes an electric current value at which the motor is rotationally driven in the locked state.

3. The brake inspection device according to claim 2, wherein
   the brake inspection device is configured to measure the first load torque and the second load torque with the motor disposed at a same position.

4. The brake inspection device according to claim 2, wherein
   the brake inspection device is configured to measure an electric current value at which the motor is rotationally driven in the locked state upon an increase in position or speed of the motor.

5. The brake inspection device according to claim 2, wherein
   the brake inspection device is configured to determine that an insufficient brake holding torque abnormality is present when the following formula is satisfied:

$$Tg/Tb \geq Th1$$

wherein
Tg is equal to (Tu+Td)/2,
Tb is equal to Tu'−Tg, and
Th1 denotes a predetermined first threshold.

6. The brake inspection device according to claim 2, wherein
   the brake inspection device is configured to determine that an insufficient brake holding torque abnormality is present when the following formula is satisfied:

$$Ag/Ab \geq Th1$$

wherein
Ag is equal to (A1+A2)/2,
Ab is equal to A3−Ag, and
Th1 denotes a predetermined first threshold.

7. The brake inspection device according to claim 2, wherein
   the brake inspection device is configured to determine that a brake release abnormality is present when the following formula is satisfied:

$$T\mu/Tb \geq Th2$$

wherein
Tµ is equal to (Tu−Td)/2,
Tb is equal to Tu'−Tg, and
Th2 denotes a predetermined second threshold.

8. The brake inspection device according to claim 2, wherein
   the brake inspection device is configured to determine that a brake release abnormality is present when the following formula is satisfied:

$$A\mu/Ab \geq Th2$$

wherein
Aµ is equal to (A1−A2)/2,
Ab is equal to A3−Ag, and
Th2 denotes a predetermined second threshold.

9. A motor controller comprising the brake inspection device described in claim 2, wherein the brake inspection device is configured to determine that a motor abnormality is present when the following formula is satisfied:

$$T\mu \geq Th3$$

wherein
Tµ is equal to (Tu−Td)/2, and
Th3 denotes a predetermined third threshold.

* * * * *